(12) United States Patent
Puiu

(10) Patent No.: US 7,104,379 B2
(45) Date of Patent: Sep. 12, 2006

(54) POWER-OPERATED CLUTCH ACTUATOR

(75) Inventor: Dumitru Puiu, Sterling Heights, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 127 days.

(21) Appl. No.: 10/968,763

(22) Filed: Oct. 19, 2004

(65) Prior Publication Data

US 2006/0081436 A1    Apr. 20, 2006

(51) Int. Cl.
F16D 13/54    (2006.01)
F16D 25/08    (2006.01)

(52) U.S. Cl. ............... 192/70.23; 192/85 C; 192/93 A
(58) Field of Classification Search ............... 74/99 A
See application file for complete search history.

(56) References Cited

U.S. PATENT DOCUMENTS

| | | | | |
|---|---|---|---|---|
| 2,461,121 A | * | 2/1949 | Markham | ............... 417/273 |
| 2,587,823 A | * | 3/1952 | De Pew | ............... 192/47 |
| 2,883,008 A | * | 4/1959 | Lucker | ............... 188/72.7 |
| 4,611,691 A | * | 9/1986 | Gornall | ............... 188/71.8 |
| 4,862,769 A | | 9/1989 | Koga et al. | |
| 5,224,906 A | | 7/1993 | Sturm | |
| 6,595,338 B1 | | 7/2003 | Bansbach et al. | |
| 6,651,793 B1 | | 11/2003 | Reisinger | |
| 6,659,250 B1 | | 12/2003 | Nestler et al. | |
| 6,793,055 B1 | * | 9/2004 | Kasuya et al. | ............... 192/54.52 |

* cited by examiner

Primary Examiner—Rodney H. Bonck
(74) Attorney, Agent, or Firm—Harness, Dickey & Pierce, P.L.C.

(57) ABSTRACT

A clutch actuator for controlling engagement of a friction clutch and having a first actuator plate rotatable about an axis, a second actuator plate adjacent to the first actuator plate, and a ballramp unit disposed between the first and second actuator plates. A piston assembly acts to induce rotation of the first actuator plate relative to the second actuator plate. Relative rotation between the first actuator plate and the second actuator plate induces linear movement of one of the first and second actuator plates along the axis to regulate engagement of the friction clutch.

16 Claims, 3 Drawing Sheets

POWER-OPERATED CLUTCH ACTUATOR

FIELD OF THE INVENTION

The present invention relates generally to power transfer systems, and more particularly, to a clutch actuator for actuating a clutch assembly in a power transfer system.

BACKGROUND OF THE INVENTION

Power transfer systems of the type used in motor vehicles including, but not limited to, four-wheel drive transfer cases, all-wheel drive power take-off units (PTU), limited slip drive axles and torque vectoring drive modules are commonly equipped with a torque transfer mechanism. In general, the torque transfer mechanism functions to regulate the transfer of drive torque between a rotary input component and a rotary output component. More specifically, a multi-plate friction clutch is typically disposed between the rotary input and output components and its engagement is varied to regulate the amount of drive torque transferred from the input component to the output component.

Engagement of the friction clutch is varied by adaptively controlling the magnitude of a clutch engagement force that is applied to the multi-plate friction clutch via a clutch actuator system. Traditional clutch actuator systems include a power-operated drive mechanism and an operator mechanism. The operator mechanism typically converts the force or torque generated by the power-operated drive mechanism into the engagement force which, in turn, can be further amplified prior to being applied to the friction clutch. Actuation of the power-operated drive mechanism is controlled based on control signals generated by a control system.

The quality and accuracy of the drive torque transferred across the friction clutch is largely based on the frictional interface between the interleaved clutch plates of the clutch pack. When partially engaged, the clutch plates slip relative to one another, thereby generating heat. As such, lubricating fluid must be directed through and around the clutch pack to cool the clutch plates. Excessive heat generation, however, can degrade the lubricating fluid and damage the friction clutch components. Additionally, electronic traction control systems require the clutch control system to respond to torque commands in a quick and accurate manner. The accuracy required to such a torque request is largely dependent on the coefficient of friction of the clutch pack. It has been demonstrated that the coefficient can change quite rapidly under various loading and/or slip conditions. The coefficient tends to fade due to significant temperature rise in the clutch pack, resulting from insufficient heat removal. The heat removal rate is dependent upon lubricating fluid flow rate and condition of the lubricating fluid.

SUMMARY OF THE INVENTION

Accordingly, the present invention is directed toward a clutch actuator that is operable to adaptively regulate engagement of a friction clutch assembly. The clutch actuator includes a power-operated drive mechanism and an operator mechanism. The operator mechanism generally includes a first actuator plate, a second actuator plate, a ballramp unit operably disposed between the first and second actuator plates, and a linear operator for controlling rotary angular movement between the first and second actuator plates. Such angular movement causes the ballramp unit to move one of the first and second actuator plates axially for generating a clutch engagement force that is applied to the friction clutch assembly.

Pursuant to a preferred construction, the ballramp unit is integrated into the first and second actuator plates to provide a compact operator mechanism. In addition, the linear operator is disposed between first and second arm segments provided on the corresponding first and second actuator plates. Preferably, the linear operator is a dual piston assembly having first and second pistons disposed in a common pressure chamber. The first piston has a first roller engaging a first cam surface formed on the first arm segment of the first actuator plate while the second piston has a second roller engaging a second cam surface formed on the second arm segment of the second actuator plate.

In accordance with another feature, the operator mechanism associated with the clutch actuator of the present invention further includes an apply plate that is disposed adjacent to the second actuator plate and which is axially moveable therewith to apply the clutch engagement force to the friction clutch assembly. In yet another feature, the operator mechanism of the clutch actuator further includes a stop plate that is disposed adjacent to the first actuator plate and which inhibits axial movement of the first actuator plate.

The drive mechanism associated with the clutch actuator of the present invention is operable to control the fluid pressure within the pressure chamber, thereby controlling the position of the first and second pistons and the relative angular position of the first actuator plate relative to the second actuator plate. The drive mechanism includes an electric motor, a ballscrew unit, a gearset interconnecting a rotary output of the motor to a rotary component of the ballscrew unit, and a control piston disposed in a control chamber. The control piston is fixed to an axially moveable component of the ballscrew unit while a fluid delivery system provides fluid communication between the control chamber and the pressure chamber. In operation, the location of the axially moveable ballscrew component within the control chamber controls the fluid pressure within the pressure chamber.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a torque transfer mechanism that can be adaptively controlled for modulating the torque transferred between a first rotary member and a second rotary member. The torque transfer mechanism finds particular application in power transfer systems of the type used in motor vehicle drivelines and which include, for example, transfer cases, power take-off units, limited slip drive axles and torque vectoring drive modules. Thus, while the present invention is hereinafter described in association with a particular arrangement for a specific driveline application, it will be understood that the arrangement shown and described is merely intended to illustrate an embodiment of the present invention.

Figure 1:
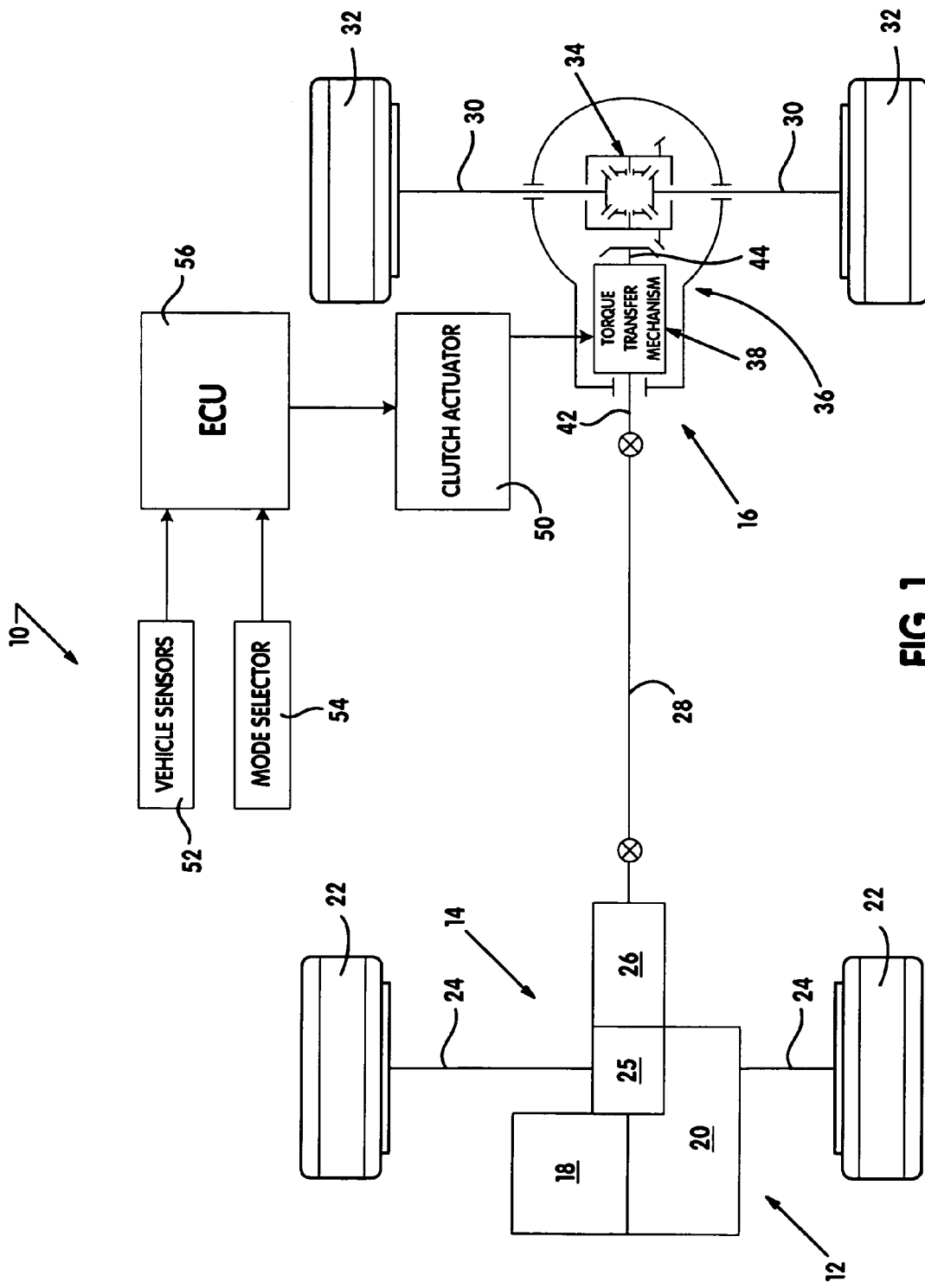
FIG. 1 illustrates an exemplary drivetrain in a four-wheel drive vehicle equipped with a power transfer system.

With particular reference to FIG. 1, a schematic layout of a vehicle drivetrain 10 is shown to include a powertrain 12, a first or primary driveline 14 driven by powertrain 12, and a second or secondary driveline 16. Powertrain 12 includes an engine 18 and a multi-speed transaxle 20 arranged to normally provide motive power (i.e., drive torque) to a pair of first wheels 22 associated with primary driveline 14. Primary driveline 14 further includes a pair of axle shafts 24 connecting wheels 22 to a front differential unit 25 associated with transaxle 20.

Secondary driveline 16 includes a power take-off unit (PTU) 26 driven by the output of transaxle 20, a propshaft 28 driven by PTU 26, a pair of axle shafts 30 connected to a pair of second wheels 32, a rear differential unit 34 driving axle shafts 30, and a power transfer device 36 that is operable to selectively transfer drive torque from propshaft 28 to rear differential unit 34. Power transfer device 36 is shown integrated into a drive axle assembly and includes a torque transfer mechanism 38. Torque transfer mechanism 38 functions to selectively transfer drive torque from propshaft 28 to differential unit 34. More specifically, torque transfer mechanism 38 includes an input shaft 42 driven by propshaft 28 and a pinion shaft 44 that drives differential unit 34.

Vehicle drivetrain 10 further includes a control system for regulating actuation of torque transfer mechanism 38. The control system includes a clutch actuator 50, vehicle sensors 52, a mode select mechanism 54 and an electronic control unit (ECU) 56. Vehicle sensors 52 are provided to detect specific dynamic and operational characteristics of drivetrain 10 while mode select mechanism 54 enables the vehicle operator to select one of a plurality of available drive modes. The drive modes may include a two-wheel drive mode, a locked ("part-time") four-wheel drive mode, and an adaptive ("on-demand") four-wheel drive mode. In this regard, torque transfer mechanism 38 can be selectively engaged for transferring drive torque from input shaft 42 to pinion shaft 44 to establish both of the part-time and on-demand four-wheel drive modes. ECU 56 controls actuation of clutch actuator 50 which, in turn, controls the drive torque transferred through torque transfer mechanism 38.

Figure 2:
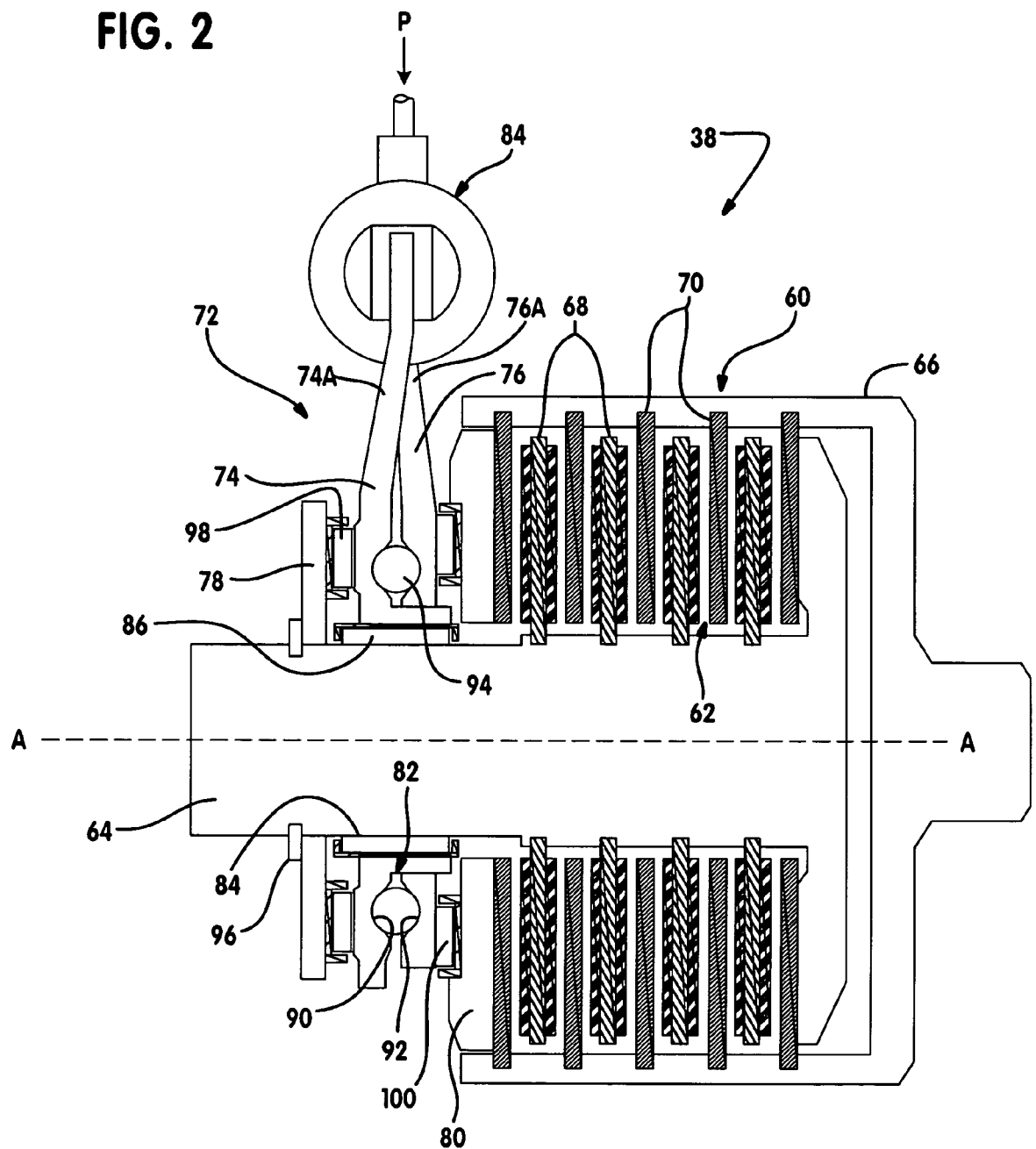
FIG. 2 is a plan view of a friction clutch assembly and a clutch actuator according to the present invention integrated in the power transfer system.
Figure 3:
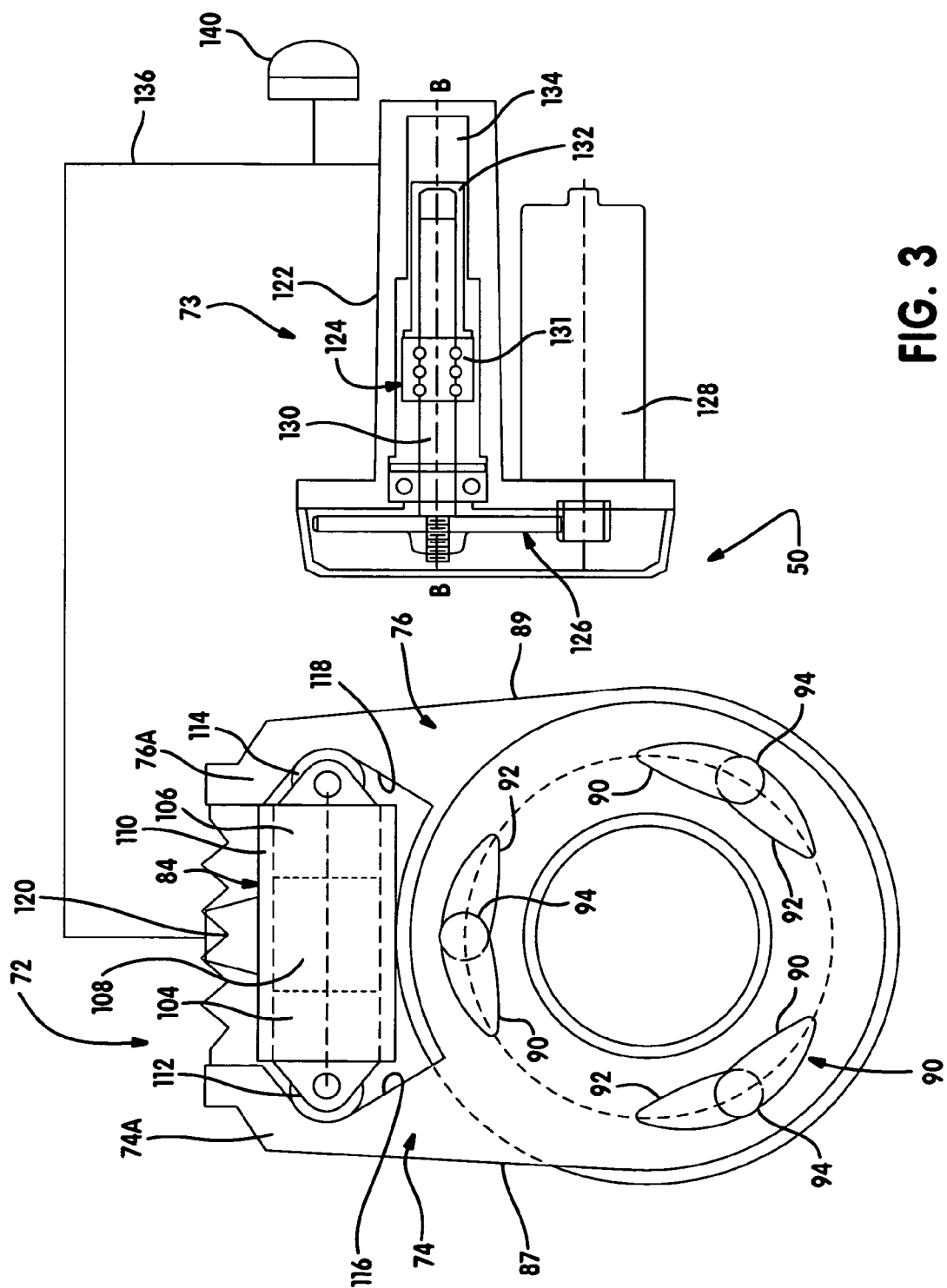
FIG. 3 is another view of the clutch actuator of the present invention.

Referring now to FIGS. 2 and 3, a cross-section of torque transfer mechanism 38 is shown. Torque transfer mechanism 38 generally include a friction clutch assembly 60 having a multi-plate clutch pack 62. Clutch actuator 50 is operable to generate and apply a clutch engagement force on clutch pack 62 so as to regulate engagement and thus, the amount of drive torque transfer through clutch pack 62. Friction clutch assembly 60 also includes a clutch hub 64 and a drum 66. Hub 64 is adapted to be coupled for rotation with input shaft 42 while drum 66 is adapted to be coupled for rotation with pinion shaft 44. As seen, a set of first or inner clutch plates 68 associated with clutch pack 62 are fixed for rotation with hub 64. Likewise, a set of second clutch plates 70 are interleaved with first clutch plates 68 and are fixed for rotation with drum 66.

The degree of engagement of clutch pack 62, and therefore the amount of drive torque transferred therethrough, is largely based on the frictional interaction of clutch plates 68 and 70. More specifically, with friction clutch assembly 60 in a disengaged state, interleaved clutch plates 68 and 70 slip relative to one another and little or no torque is transferred through clutch pack 62. However, when friction clutch assembly 60 is in a fully engaged state, there is no relative slip between clutch plates 68 and 70 and 100% of the drive torque is transferred from input shaft 42 to pinion shaft 44. In a partially engaged state, the degree of relative slip between interleaved clutch plates 68 and 70 varies and a corresponding amount of drive torque is transferred through clutch pack 62.

In general, clutch actuator 50 includes an operator mechanism 72 and a power-operated drive mechanism 73. Operator mechanism 72 is shown to include a first actuator plate 74, a second actuator plate 76, a stop plate 78, an apply plate 80, a ballramp unit 82, and a piston assembly 84. First and second actuator plates 74 and 76 are rotatably supported on hub 64 by a bearing assembly 86 and include corresponding arm segments 74A and 76A, respectively, that extend tangentially. More specifically, arms 74A and 76A include respective edges 87 and 89 that are generally parallel to the axis A.

First and second actuator plates 74 and 76 also include first and second ballramp groove sets 90 and 92, respectively. Balls 94 are disposed between first and second actuator plates 74 and 76 and ride within ballramp groove sets 90 and 92. As best seen from FIG. 3, each set has three equally spaced grooves aligned circumferentially relative to the "A" axis. Thus, ballramp unit 82 is shown to be integrated into actuator plates 74 and 76 so as to provide a compact arrangement. Stop plate 78 is supported on hub 64 and is inhibited from axial movement by a lock ring 96. More specifically, stop plate 78 is disposed between lock ring 96 and first actuator plate 74 and is separated from first actuator plate 74 by a thrust bearing assembly 98. Apply plate 80 is disposed between clutch pack 62 and second actuator plate 76 and is separated from second actuator plate 76 by another thrust bearing assembly 100. Apply plate 80 is adapted to move axially to regulate engagement of clutch pack 62, as is explained in further detail below.

Piston assembly 84 is actuated by drive mechanism 73 to control relative rotation between first and second actuator plates 74 and 76. More specifically, piston assembly 84 includes a first piston 104 and a second piston 106 that are disposed for sliding movement within a pressure chamber 108 formed in a cylinder housing 110. As seen, first and second pistons 104 and 106 have first and second rollers 112 and 114, respectively, attached thereto. First and second rollers 112 and 114 engage corresponding first and second cam surfaces 116 and 118 formed on first and second arms 74A and 76A, respectively. First and second rollers 112 and 114 are induced to ride against first and second cam surfaces 116 and 118 in response to movement of pistons 104 and 106 caused by actuation of drive mechanism 73. Specifically, rolling movement of first and second rollers 112 and 114 against first and second cam surfaces 116 and 118 results in relative rotation between first and second actuator plates 74 and 76. Pistons 104 and 106 are shown in FIG. 3 in a first or "retracted" position within pressure chamber 108 such that first and second actuator plates 74 and 76 are located in a corresponding first angular position relative to each other. A return spring 120 is provided for normally biasing first and second actuator plates 74 and 76 toward this first angular position. With the actuator plates located in their first angular position, ballramp unit 82 functions to axially locate second actuator plate 76 in a corresponding first or "released" position whereat apply plate 80 is released from engagement with clutch pack 62. In this position, a minimum clutch engagement force is applied to clutch pack 62 such that little or no drive torque is transmitted from input shaft 42 to pinion shaft 44.

As will be detailed, drive mechanism 73 is operable to cause pistons 104 and 106 to move toward a second or "expanded" position within pressure chamber 108 such that actuator plates 74 and 76 are caused by engagement with rollers 112 and 114 to circumferentially index to a second angular position. Such rotary indexing of actuator plates 74 and 76 causes ballramp unit 82 to axially displace second actuator plate 76 from its released position toward a second or "locked" position whereat apply plate 80 is fully engaged with clutch pack 62. With second actuator plate 76 in its locked position, a maximum clutch engagement force is applied to clutch pack 62 such that pinion shaft 44 is, in effect, coupled for common rotation with input shaft 42.

Drive mechanism 73 is shown in FIG. 3 to include a piston housing 122, a ballscrew and piston assembly 124, a gearset 126, and an electric motor 128. Electric motor 128 rotatably drives gearset 126 which, in turn, rotatably drives a leadscrew 130 associated with piston assembly 124. Such rotation of leadscrew 130 results in axial movement of a nut 131 mounted thereon which, in turn, causes corresponding axial movement of a piston plunger 132 within a fluid control chamber 134 formed in housing 122. Control chamber 134 is in fluid communication with pressure chamber 108 via a closed hydraulic control system. Specifically, as piston plunger 132 translates along an axis "B", it regulates the volume of fluid in control chamber 134. As the volume of control chamber 134 decreases, fluid is supplied through a conduit 136 to pressure chamber 108 in piston assembly 84, thereby causing pistons 104 and 106 to move in concert toward their expanded position. In contrast, as the volume of control chamber 134 increases, the fluid flows back through conduit 136 from piston chamber 108 to relieve the pressure exerted by first and second rollers 112 and 114 against first and second cam surfaces 116 and 118.

Accordingly, rotation of leadscrew 130 in a first rotary direction results in axial movement of piston plunger 132 in a first direction (right in FIG. 3), thereby causing pistons 104 and 106 to be forcibly moved toward their expanded position for angularly indexing first and second actuator plates 74 and 76 toward their second angular position in opposition to the biasing force exerted thereon by return spring 120. In contrast, rotation of leadscrew 130 in a second rotary direction results in axial movement of piston plunger 132 in a second direction (left in FIG. 3), thereby permitting the biasing force of return spring 120 to forcibly rotate actuator plates 74 and 76 toward their first angular position which causes pistons 104 and 106 to move back toward their retracted position. A pressure sensor 140 is responsive to the pressure within conduit 136 and generates a signal that is sent to ECU 56. Preferably, ECU 56 is functional to correlate line pressure readings from pressure sensor 140 to the torque output of friction clutch assembly 60.

In its neutral state (see FIG. 3), clutch actuator 50 imparts no clutch engagement force on clutch pack 62 such that first and second clutch plates 68 and 70 are permitted to slip relative to one another. As first and second actuator plates 74 and 76 are caused to rotate relative to one another, balls 94 ride within ballramp grooves 90 and 92 to axially move second actuator plate 76. Since stop plate 78 inhibits axial movement of first actuator plate 74, as balls 94 ride up ballramp grooves 90 and 92, second actuator plate 76 is separated from first actuator plate 74 and moves linearly to impart the clutch engagement force on apply plate 80 through thrust bearing assembly 100. Apply plate 80, in turn, imparts this linear clutch engagement force on clutch pack 62, thereby regulating engagement of clutch pack 62.

It is contemplated that alternative drive mechanisms can be used in place of the closed-circuit hydraulic system disclosed. For example, a motor-driven dual leadscrew system could be implemented to drive first and second pistons 104 and 106 of operator mechanism 72 in concert between their retracted and expanded positions. Likewise, it is to be understood that the particular drivetrain application shown is merely exemplary of but one application to which the clutch actuator of the present invention is well suited.

A preferred embodiment has been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A clutch actuator for applying a clutch engagement force on a friction clutch, comprising:
   an operator mechanism including an axially fixed first actuator plate rotatable about an axis and having a set of first grooves and a first arm segment with a first cam surface formed thereon, a second actuator plate rotatable about said axis for angular movement relative to said first actuator plate and having a set of second grooves, balls disposed in aligned pairs of said first and second grooves, and a piston assembly including a first roller engaging said first cam surface such that movement of said piston assembly between first and second positions causes corresponding relative angular movement of said first and second actuator plates between first and second angular positions so as to cause corresponding axial movement of said second actuator plate relative to the friction clutch; and
   a power-operated drive mechanism for controlling movement of said piston assembly.

2. The clutch actuator of claim 1 wherein said second actuator plate is located in a first axial position relative to said first actuator plate when said first and second actuator plates are rotated to their first angular position so as to apply a minimum clutch engagement force on the friction clutch, and wherein said second actuator plate is located in a second axial position relative to said first actuator plate when said first and second actuator plates are rotated to their second angular position so as to apply a maximum clutch engagement force on the friction clutch.

3. The clutch actuator of claim 2 wherein said second actuator plate includes a second arm segment having a second cam surface formed thereon, wherein said piston assembly further includes a second piston having a second roller engaging said second cam surface, and wherein said drive mechanism is operable for causing coordinated movement of said first and second pistons.

4. The clutch actuator of claim 3 wherein said first and second pistons are in a retracted position relative to each other to define said first position of said piston assembly, and wherein said first and second pistons are in an expanded position relative to each other to define said second position of said piston assembly.

5. The clutch actuator of claim 4 wherein said first and second pistons are disposed for sliding movement in a pressure chamber, and wherein said drive mechanism is operable for controlling the fluid pressure in said pressure chamber so as to control movement of said first and second pistons between their retracted and expanded positions.

6. The clutch actuator of claim 5 wherein said drive mechanism includes a control piston retained in a control chamber that is in fluid communication with said pressure chamber, and an electric motor for controlling sliding movement of said control piston with said control chamber.

7. A clutch actuator for applying a clutch engagement force on a friction clutch, comprising:
an operator mechanism including an axially fixed first actuator plate rotatable about an axis and having a set of first grooves and a first arm with a first cam surface, a second actuator plate rotatable about said axis for angular movement relative to said first actuator plate and having a set of second grooves, balls disposed in aligned pairs of said first and second grooves, and a piston assembly having a first roller riding on said first cam surface to induce rotation of said first actuator plate so as to cause corresponding axial movement of said second actuator plate relative to said friction clutch; and
a power-operated drive mechanism for controlling movement of said piston assembly.

8. The clutch actuator of claim 7 wherein said second actuator plate is rotatable about said axis and includes a second arm that tangentially extends from said second actuator plate, and wherein said piston assembly acts on said second arm to induce rotation of second actuator plate.

9. The clutch actuator of claim 8 wherein said second arm includes a second cam surface and said piston assembly includes a second roller that selectively rides along said second cam surface to induce rotation of second actuator plate.

10. The clutch actuator of claim 9 wherein said piston assembly includes first and second piston, said first piston selectively acting on said first actuator plate and said second piston selectively acting on said second actuator plate.

11. A torque transfer mechanism, comprising:
a first rotary member;
a second rotary member;
a friction clutch operably disposed between said first and second rotary members; and
a clutch actuator for applying a clutch engagement force to said friction clutch, said clutch actuator including an operator mechanism having a first actuator plate rotatably supported on one of said first and second rotary members for rotation about an axis, said first actuator plate having a set of first grooves and a first arm segment having a first cam surface thereon, a second actuator plate rotatable about said axis for angular movement relative to said first actuator plate and having a set of second grooves, balls disposed in aligned pairs of said first and second grooves, and a piston assembly including a first roller engaging said first cam surface such that movement of said piston assembly between first and second positions causes corresponding angular movement of said first and second actuator plates between first and second angular positions so as to cause corresponding axial movement of said second actuator plate relative to the friction clutch; and
a power-operated drive mechanism for controlling movement of said piston assembly.

12. The torque transfer mechanism of claim 11 wherein said second actuator plate is located in a first axial position relative to said first actuator plate when said first and second actuator plates are rotated to their first angular position so as to apply a minimum clutch engagement force on said friction clutch, and wherein said second actuator plate is located in a second axial position relative to said first actuator plate when said first and second actuator plates are rotated to their second angular position so as to apply a maximum clutch engagement force on said friction clutch.

13. The torque transfer mechanism of claim 12 wherein said second actuator plate includes a second arm segment having a second cam surface formed thereon, wherein said piston assembly includes a first piston having said first roller secured thereto and a second piston having a second roller secured thereto in engagement with said second cam surface, and wherein said drive mechanism is operable for causing coordinated movement of said first and second pistons.

14. The torque transfer mechanism of claim 13 wherein said first and second pistons are in a retracted position relative to each other to define said first position of said piston assembly, and wherein said first and second pistons are in an expanded position relative to each other to define said second position of said piston assembly.

15. The torque transfer mechanism of claim 14 wherein said first and second pistons are disposed for sliding movement in a pressure chamber, and wherein said drive mechanism is operable for controlling the fluid pressure in said pressure chamber so as to control movement of said first and second pistons between their retracted and expanded positions.

16. The torque transfer mechanism of claim 15 wherein said drive mechanism includes a control piston retained in a control chamber that is in fluid communication with said pressure chamber, and an electric motor for controlling sliding movement of said control piston with said control chamber.

* * * * *